United States Patent [19]

Shantz et al.

[11] Patent Number: 4,944,977
[45] Date of Patent: Jul. 31, 1990

[54] FRICTION WELDING FLASH TRAP SEAL

[75] Inventors: Ronald B. Shantz, Sheffield; Robert J. Knight, Guelph, both of Canada

[73] Assignee: A.R.D. Industries Ltd., Cambridge, Canada

[21] Appl. No.: 334,559

[22] Filed: Apr. 7, 1989

Related U.S. Application Data

[63] Continuation of Ser. No. 52,084, May 19, 1987, Pat. No. 4,832,769.

[51] Int. Cl.$^5$ .................. B23K 20/12; B29C 65/06
[52] U.S. Cl. .................. 428/36.92; 156/69; 156/73.5; 156/294; 215/232; 220/361; 220/362; 220/363; 428/35.8
[58] Field of Search .................. 156/69, 73.5, 294; 228/112, 155; 264/68, 248; 215/232; 220/361, 362, 363, DIG. 14; 428/35.7, 35.8, 36.92

[56] References Cited

U.S. PATENT DOCUMENTS 3,690,088 9/1972 Anderson et al. .................. 156/73.5
3,799,821 3/1974 Jones .................. 156/73.5

FOREIGN PATENT DOCUMENTS 1436217 5/1976 United Kingdom .................. 156/73.5
2174672 11/1986 United Kingdom .

Primary Examiner—Michael Wityshyn
Attorney, Agent, or Firm—Carson, Armstrong

[57] ABSTRACT

A friction welded part having a sealed flash trap is disclosed, along with a method for producing such parts. The friction welded parts have a hollow cylindrical part and a second part to which the hollow cylindrical part is friction welded. There is an internal flash trap in the region of the weld, and the hollow cylindrical part is pinched inwardly or a conical flange on the flash trap is deformed outwardly so as to seal the flash collecting portions of the flash trap from the hollow portion of the hollow cylindrical part remote from the weld. The method involves the conventional steps of rotating the parts with respect to each other under pressure, stopping the rotation, and exerting high pressure to form the weld. In accordance with the invention, the hollow cylindrical part in the region adjacent the flash trap is then forced inwardly or a flange on the flash trap is forced outwardly so as to effect the seal. Rolling is the preferred method of forcing the hollow cylindrical part inwardly, and is preferably carried out immediately after the welding, so that the remaining weld heat can be used to advantage. A mandrel or punch is used if a flange on the flash trap is forced outwardly.

4 Claims, 2 Drawing Sheets

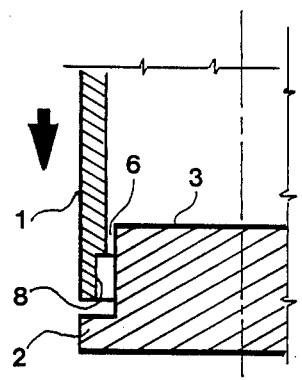
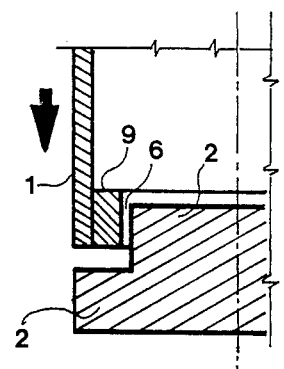
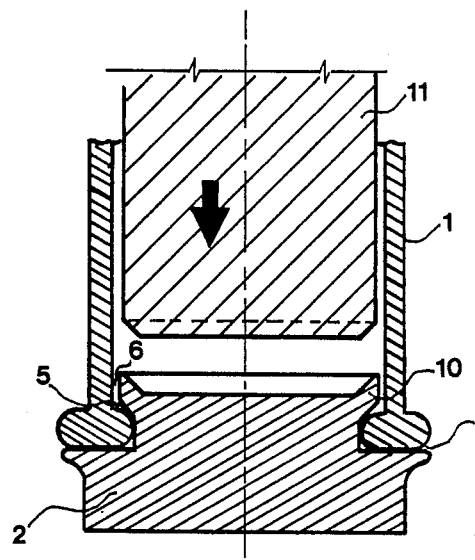

FRICTION WELDING FLASH TRAP SEAL

REFERENCE TO RELATED APPLICATION

This is a continuation of U.S. application Ser. No. 07/052,084, filed May 19, 1987, now U.S. Pat. No. 4,832,769.

BACKGROUND OF THE INVENTION

1. Field of the Invention

This invention relates generally to friction welding, and particularly to friction welded parts having a flash trap. The invention provides friction welded parts with a novel sealed flash trap and a method of producing such parts.

Friction welding is a well-known manufacturing process which uses axial force and rotational motion to heat a circular interface (solid or tubular) by friction, plasticizing and upsetting material into "flash rolls" while losing axial length, and then arresting the rotational motion and usually increasing axial force, to form a solid state forge bond between two or more components. It may be performed either on continuous drive friction welding machines using a constant speed motor drive, or on inertia friction welding machines which store kinetic energy in a flywheel attached to the machine spindle and disperse that energy to the weld interface when axial force is applied, or on hybrid machines combining both methods.

Although conventional friction welding results in a totally random stopped position, specifically equipped machines with an "angular orientation" capability may be used to align asymmetrical features on opposite sides of the symmetrical interface by stopping the machine spindle in the same location every cycle.

Flash is of course inherent in friction welding. In some applications, the flash can be ignored, but in other applications cannnot be tolerated. The flash may have small particulate matter which could break away and cause problems, or an oxidized flash scale which may also break free to cause problems. In some applications, even minute particles breaking away from the flash cannot be tolerated. For example, in hydraulic cylinders, where the end of the cylinder may be friction welded to the body, contamination as small as 10 microns cannot be permitted.

2. Description of the Prior Art

In the past, this problem has meant that friction welding could not be used for certain applications, unless elaborate steps were taken to eliminate the flash, e.g. by machining, or by using some form of sealant to seal off the area of the weld from the area to be kept uncontaminated.

External and internal (for tubular welds) flash may be removed by shearing tools, turning tools, or boring tools on the welder. Alternatively, "flash traps" may be used to partially isolate internal or external flash rolls. A flash trap, in the case of an internal flash trap, is typically in the form of a solid cylinder of diameter slightly less than the inner diameter of the hollow cylindrical part, extending along the hollow cylindrical part back from the region of the weld, and having an annular recess in the region of the weld. The flash is "trapped" in this annular recess. However, there must normally be some clearance between the rotating components, i.e. between the hollow cylinder and the solid flash trap cylinder, so that the concentricity limitation (accuracy under load) of the machine used does not result in "rubbing" or "pickup" away from the friction surfaces, with consequent damage and creation of scale and loose particulate matter. The existence of this clearance provides a path for small particulate matter to escape the trap. In the prior art, that clearance in flash traps of this and other configurations has been sealed by subsequent operations using epoxy, "O" rings, conventional welding, etc., which renders the production of the parts somewhat uneconomical.

SUMMARY OF THE INVENTION

It is an object of the invention to provide a tightly closed interior flash trap, to provide an economical solution to the problem.

Thus in accordance with the present invention the hollow cylindrical part adjacent the non-recessed portion of the flash trap is pinched inwardly, thereby sealing the recessed area of the flash trap from the hollow portion of the hollow cylindrical part remote from the weld.

Alternatively, the flash trap includes an annular conical flange which is deformed outwardly, thereby sealing the recessed area of the flash trap from the hollow portion of the hollow cylindrical part remote from the weld.

In accordance with the method, as described and claimed in the related application, the conventional steps of rotating the parts with respect to each other under pressure, stopping the rotation, and exerting high pressure to form the weld, are improved by then forcing the hollow cylindrical part adjacent the non-recessed portion of the flash trap inwardly against the non-recessed portion of the flash trap, or by forcing an annular conical flange on the flash trap outwardly, thereby sealing the recessed area of the flash trap from the hollow portion of hollow cylindrical part remote from the weld. This step is preferably carried out immediately after the welding, so that the remaining weld heat can be used.

Further features of the invention will be described or will become apparent in the course of the following detailed description.

BRIEF DESCRIPTION OF THE DRAWINGS

In order that the invention may be more clearly understood, the preferred embodiment thereof and the preferred method will now be described in detail by way of example, with reference to the accompanying drawings, in which:

FIG. 3 is a sectional illustration showing an alternative flash trap arrangement;

FIG. 4 is a sectional illustration showing yet another alternative flash trap arrangement; and FIG. 5 is a sectional illustration showing a part in which the flash trap has an annular conical flange which is deformed instead of the hollow cylinder.

DETAILED DESCRIPTION OF THE PREFERRED EMBODIMENTS

Figure 1:
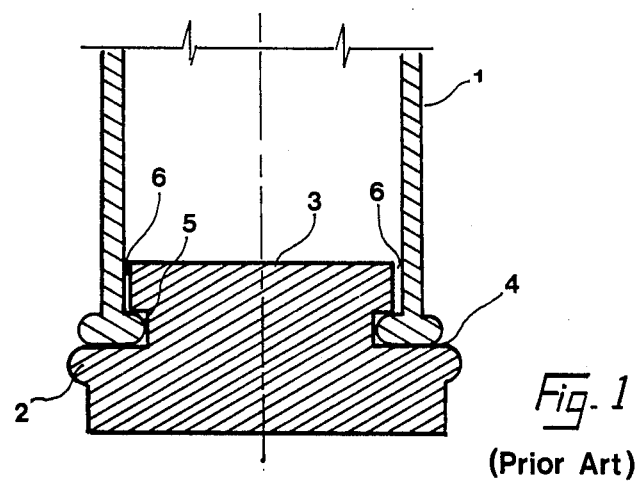
FIG. 1 is a sectional illustration of a part produced in accordance with the prior art.
Figure 2:
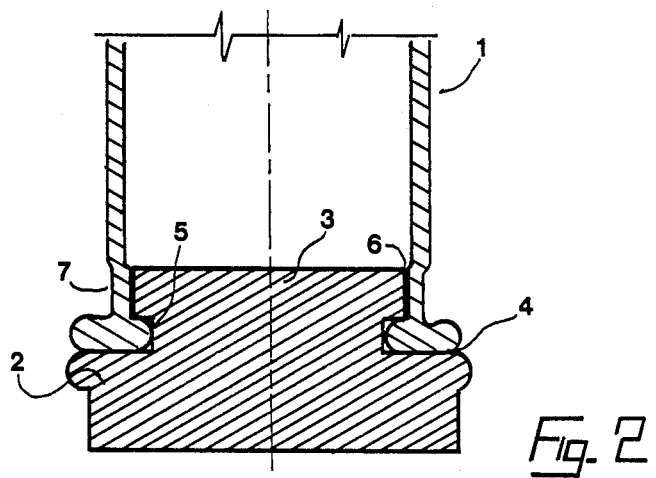
FIG. 2 is a sectional illustration of a corresponding part as produced according to the invention.

FIG. 1 shows a sectional view of a typical part produced according to the prior art, and FIG. 2 shows a sectional view of a typical part produced according to the present invention. Illustrated is a hollow cylindrical part 1 friction welded to an end cap 2, the end cap including a flash trap in the form of a solid cylindrical portion 3 of diameter slightly less than the inner diameter of the cylindrical part 1, extending along the cylindrical part 1 back from the region of the weld 4, and having an annular recess 5 in the region of the weld to receive flash from the weld. Because the diameter of the solid cylindrical portion 3 is slightly less than the inner diameter of the cylindrical part 1, so that the concentricity limitation (accuracy under load) of the machine used does not result in "rubbing" or "pickup" away from the friction surfaces, with consequent damage and creation of scale and loose particulate matter, there is a clearance path 6 for small particulate matter to escape the trap, i.e. the annular recess 5. In the prior art, if friction welding was to be used in applications where such contamination was not permissible, the clearance path 6 had to be sealed in subsequent operations using epoxy, "O" rings, conventional welding, etc., rendering the production of the parts somewhat uneconomical.

In FIG. 2, the improvement offered by the present invention can be seen. The portion of the hollow cylindrical part 1 adjacent the non-recessed portion of the solid cylindrical portion 3 is rolled inwardly at deformed area 7 so as to seal off the clearance path 6. Alternatively, as seen in FIG. 5, the flash trap may be deformed outwardly with the same effect, as will be described in greater detail below.

The method produces this friction welded assembly with a tightly closed flash trap, on the friction welding machine as part of the machine cycle, while still allowing adequate clearance during the rotational part of the weld cycle.

The method is carried out by first running through the "weld" portion of the machine cycle in a conventional manner, complete with the usual clearance. Then, immediately at the completion of the weld portion of the machine cycle, while the material adjacent to the weld 4 is hot, the spindle of the friction welding machine is restarted, this time rotating the complete welded assembly, and a roller or rollers is/are brought into contact with the assembly opposite the "clearance" area and a force is applied to the roller(s) so that material is upset or rolled into, or spun into, the flash trap clearance area, closing it tightly. The weld heat allows the upset to occur with much less force than if the assembly were cold, and the subsequent shrinkage on full cooling ensures an even tighter seal. The roller force may be time and/or travel and/or force controlled, prior to the machine spindle stopping and the assembly being unloaded.

The deformed area 7 could be created by any suitable means, not being limited to rolling, and at any convenient time. For example, the part could be reheated and then rolled, or cold rolling could be used (though presumably with less satisfactory results).

It will be appreciated that the above description relates to the preferred embodiment and method by way of example only. Many variations on the invention will be obvious to those knowledgeable in the field, and such obvious variations are within the scope of the invention as described and claimed, whether or not expressly described.

For example, it should be apparent that the invention can be applied to virtually any friction weld involving a flash trap where rolling or the like could be used to seal the area of the flash trap, not being restricted to the specific parts described above. FIGS. 3 and 4 provide examples of possible alternative flash trap configurations. In FIG. 3, the flash trap is formed by machining a reduced wall thickness section 8 in the hollow cylindrical part 1. No recessed area is then required in the solid cylindrical portion 3. In FIG. 4, the solid cylindrical portion 3 is considerably reduced in diameter, and the flash trap is created by virtue of the presence of a ring 9 inside the hollow cylindrical part 1. Whatever the configuration of the flash trap, the essence of the invention lies in creating the deformed area 7 after creating the weld, in order to seal the flash trap.

The alternative shown in FIG. 5 involves an annular conical flange 10 at the inner end of the solid cylindrical portion 3. Instead of a roller or the like deforming the wall of the hollow cylindrical part 1, a mandrel or punch 11 is used to deform the flange 10 outwardly, thereby effecting the desired seal. The mandrel or punch 11 has a chamfered end to match the conical shape of the flange 10, so that axial pressure forces the flange radially. This alternative version of the product and method may be desireable in many cases despite the added complexity of the operation, as for example where the external cosmetics of the hollow cylindrical part 1 may be important, or where the wall thickness of the hollow cylindrical part 1 dictates against rolling it inwardly.

Such a part is formed by completing the weld and then forcing the flange 10 against the mandrel 11 or vice versa. For example, after friction welding the parts in the conventional manner, the mandrel 11 could be automatically advanced inside the hollow cylindrical part 1, and backstopped. The hollow cylindrical part could then be unclamped, and the welded assembly advanced toward the mandrel 11 by the welder cylinder, to deform the flange 10 and effect the seal.

What is claimed as the invention is:

1. In a friction welded part comprising firstly a hollow cylindrical part defining a cavity and secondly a second part to which said hollow cylindrical part is friction welded, said friction welded part including a friction weld between said hollow cylindrical part and said second part, and an internal flash trap in the region of the weld, said flash trap being defined between said hollow cylindrical part and said second part, the improvement in which one of said hollow cylindrical part and said second part is deformed towards the other part at a location remote from the weld and between the weld and the cavity without a weld formed at said location, so as to seal said flash trap from the cavity.

2. A friction welded part as recited in claim 1, in which said hollow cylindrical part is deformed inwardly in the region adjacent said flash trap so as to seal said flash trap from the cavity at said location remote from the weld.

3. A friction welded part as recited in claim 2, in which said flash trap is defined by a solid cylinder of diameter slightly less than the inner diameter of said hollow cylindrical part, said solid cylinder projecting from said second part and extending along said hollow cylindrical part past the region of the weld, said solid cylinder having an annular recess in the region of the weld to receive flash from the weld, said hollow cylindrical part being deformed inwardly against said solid cylinder at said location between said flash trap and the cavity.

4. A friction welded part as recited in claim 1, in which said flash trap is defined by a solid cylinder of a diameter substantially less than the inner diameter of said hollow cylindrical part, said solid cylinder projecting from said second part and extending along said hollow cylindrical part past the region of the weld, and having at its projecting end an axially and outwardly projecting conical flange, said flange being deformed outwardly against said hollow cylindrical part at said location between said flash trap and the cavity.

* * * * *